United States Patent
Kane et al.

[19]

[11] Patent Number: 6,088,571
[45] Date of Patent: Jul. 11, 2000

[54] METHOD AND APPARATUS FOR MULTI-CONSTELLATION SATELLITE BROADCAST WITH ERROR CORRECTION

[75] Inventors: John Richard Kane, Phoenix; Keith Andrew Olds, Mesa, both of Ariz.

[73] Assignee: Motorola, Inc., Schaumburg, Ill.

[21] Appl. No.: 09/015,955

[22] Filed: Jan. 30, 1998

[51] Int. Cl.$^7$ .................................................. H04B 7/185
[52] U.S. Cl. ........................................ 455/12.1; 455/13.1
[58] Field of Search ................................. 455/12.1, 13.1, 455/13.2, 15, 16, 18, 24, 7, 8, 9, 3.2, 5.1, 427, 428, 430; 370/316

[56] References Cited

U.S. PATENT DOCUMENTS 5,594,490  1/1997  Dawson et al. ...................... 455/3.2 X
5,722,042  2/1998  Kimura et al. ........................ 455/13.1

*Primary Examiner*—Fan Tsang
*Assistant Examiner*—Philip J. Sobutka
*Attorney, Agent, or Firm*—Bradley J. Botsch

[57] ABSTRACT

A hybrid satellite-based data broadcast system reliably broadcasts data from a ground-based high earth orbit, HEO, server (105) to a plurality of customer provided equipment, CPE, receivers (113) via a HEO satellite constellation satellite (109). When errors in received broadcast data are detected by the CPE (113), error information is communicated via a low earth orbit, LEO, satellite constellation (121, 125) to a LEO gateway (103) which in turn obtains the correct data and transmits the correct data back to the CPE receiver via the LEO satellite constellation (121, 125).

34 Claims, 3 Drawing Sheets

6,088,571

METHOD AND APPARATUS FOR MULTI-CONSTELLATION SATELLITE BROADCAST WITH ERROR CORRECTION

FIELD OF THE INVENTION

This invention pertains to communications systems, in general, and to arrangements for broadcasting data via satellite based systems, in particular.

BACKGROUND OF THE INVENTION

One arrangement for distributing large data files to multiple locations utilizes broadcasting of the data. Typically broadcasting utilizes so-called "single-point to multi-point" communications broadcast technology. For some applications, transferring data in this manner is efficient and cost effective. This technique is presently used with satellite technology to broadcast television signals and the like. One limitation of wireless broadcast technology is that, transmission path errors may result in each recipient of the broadcast data receiving different data because of the different transmission paths between the broadcast point and the multiple receiving points. Furthermore, because different transmission paths may produce different reception errors, all recipients of the broadcast may not incur the same error.

This limitation excludes use of conventional single-point to multi-point broadcast technology for certain applications for which data files must be received without error at multiple locations. For example, communication of certain financially oriented data or software must be delivered without error. To transfer data with high accuracy requires that information be exchanged between the transmitting point of the data and each recipient of the data. The information exchanged may be as simple as an acknowledgment that the data has been received error free, or may include requests for retransmission of part or all of the data files. Typically the transfer of data requiring high accuracy in reception is accomplished using "point-to-point" communications. Use of a point-to-point communication system to deliver large amounts of the same data to a large number of recipients is generally not time or cost effective.

Communication satellites are used to transmit and receive large amounts of data over high bandwidth communication links. To achieve the high bandwidths, the frequencies utilized for satellite communications links are in the ultra high frequency (uhf) and above radio spectrum. Although the use of UHF and higher frequencies permits the transfer of information at high data rates, signals transmitted at such high frequencies are received only at receivers which are in line of sight with the satellite.

Communication satellites are characterized as being high earth orbit (HEO) or low earth orbit (LEO) satellites. HEO satellites include Geostationary Earth Orbiting (GEO) satellites which are in geosynchronous earth orbit. GEO satellites are particularly well suited for the broadcast of information because the height above earth assures that the radiation pattern provides for line of sight communications over up to a hemisphere of earth. However, because of the GEO satellite distance from the earth, on the order of 22,000 miles, propagation times between an earth based station transmitting data and a second earth based receiver become significant. Round trip propagation delay between two earth stations can be approximately one half second. Because of the significant propagation delay, returns signals from a receiving station indicating errors in received data are not received until an additional one half second of data has been transmitted. Furthermore, the range distance between the receiving station and a GEO satellite requires relatively high power to be transmitted if a return signal is to be transmitted through a GEO. This is incompatible with low cost terminals. Because of the hemispheric coverage of GEO satellites, they are particularly well adapted to broadcast of data to large numbers of recipients. However, there is no present provision for the re-broadcasting of data for correction of reception errors in data broadcast from HEO or GEO satellites.

In contrast, LEO satellites because of their proximity to earth do not have the large propagation delays in round trip communications between two earth stations served through one or more LEO satellites. However, because of the proximity of LEO satellites to the earth's surface, the line of sight coverage area is relatively small. Therefore, LEO satellites generally are not as effective as HEO satellites in widespread broadcasting of data but serve well for point-to-point communication. Typically, to provide communication coverage of the entirety of the earth, both LEO and GEO satellites are provided in constellations of multiple satellites. One known LEO satellite constellation arrangement has been well documented and is known as the IRIDIUM® satellite system manufactrured by Motorola, Inc. GEO satellite arrangements are likewise known.

It is desirable to provide an arrangement which provides the data broadcast capabilities of a single point to multiple point arrangement along with the advantages of point to point communication systems to allow more efficient, less costly, and more reliable broadcast delivery of data.

BRIEF DESCRIPTION OF THE DRAWING

The invention will be better understood from a reading of the following detailed description taken in conjunction with the drawings in which like reference designators identify like elements, and in which.

DETAILED DESCRIPTION

The present invention utilizes a hybrid satellite communications system to provide for the geographically widespread broadcast of data and to provide for error correction by selective retransmission of data to receivers which provide an indication of non reception of accurate broadcast data. In accordance with the principles of the invention, a system for the broadcast of data utilizes both a HEO satellite constellation and a LEO satellite constellation. The HEO satellite constellation is utilized to provide single-point to multiple-point broadcasting of data. The LEO satellite constellation provides a return path for receivers to provide an indication that broadcast data has not been properly received. In addition and further in accordance with the principles of the invention, the LEO satellite constellation is used to provide a communication path for the selective retransmission of data to the receivers. Use of a hybrid satellite constellation provides the advantages of both the broadcast capabilities of a HEO satellite constellation and the point to point capabilities of both LEO satellite constellations.

Figure 1:
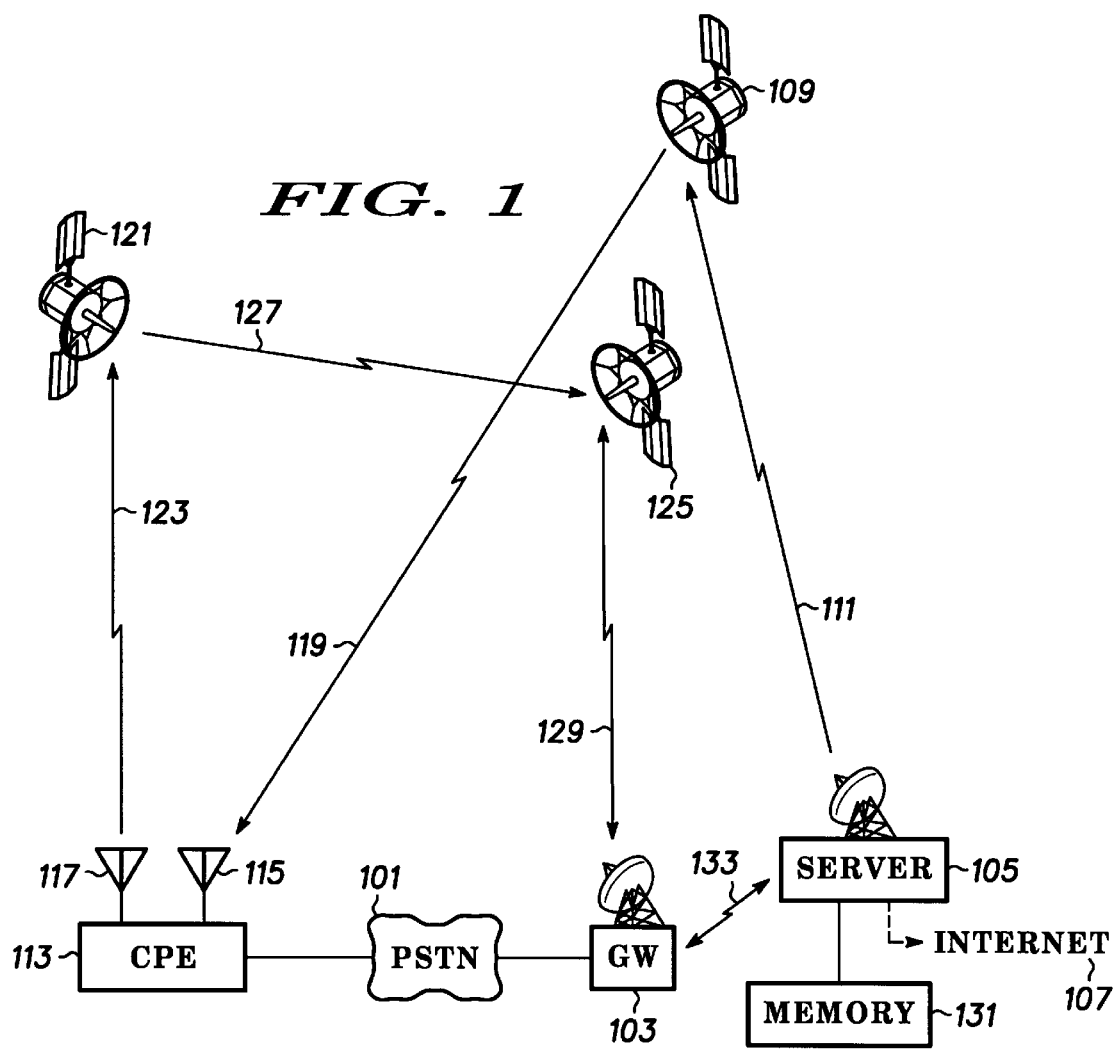
FIG. 1 is a block diagram of a hybrid constellation satellite system arrangement in accordance with the invention.

Turning now to FIG. 1, a hybrid satellite constellation broadcast arrangement in accordance with the invention is shown. The system includes a HEO satellite constellation, which in the preferred embodiment of the invention is a GEO satellite constellation, and a LEO satellite constellation. The GEO satellite constellation is represented by a satellite 109. As is understood by those skilled in the art, although only one satellite is shown, a GEO satellite constellation providing substantially full earth coverage would comprise a plurality of such satellites. The construction and operation of GEO communication satellites is known and the particular details are described in the prior art. The system of FIG. 1 also includes a representative portion of a LEO satellite constellation. Two LEO satellites 121 and 125 are shown. Although only two LEO satellites are shown, it is to be understood that the two satellites 121,125 are representative of a satellite constellation of LEO satellites. One such constellation is the well documented IRIDIUM® satellite system developed by the assignee of the present invention. The IRIDIUM® system utilizes a constellation of about 66 satellites to provide global communications coverage. Each of the LEO satellites moves relative to the surface of the earth and the result is that a stationary earth station utilizing the LEO satellite constellation will be served by a number of LEO satellites over a period of time.

An earth based gateway or server 105 is used to communicate to and from the GEO satellite 109. Servers such as server 105 provide a direct link to the GEO satellite 109 via a high bandwidth communication link 111. In the embodiment of the invention shown, data to be broadcast is provided to the server 105 from a data source which in the illustrative embodiment is provided via the Internet 107. It will be understood that use of the Internet is only one of a multitude of data sources which may be used to provide the data which is to be broadcast. Associated with the server 105 is a memory 131 which is used to store the data which is broadcast. The memory 131 may be any conventional memory which can store large volumes of data and which has high access rates. The particular type of memory is not important. The memory 131 is preferably co-located with server 105. The data which is broadcast is transmitted to GEO satellite via communication link 111. The communication link 111 is conventional GEO satellite communication link. GEO satellite 109 receives the data over communication link 111 and broadcasts the data by re-transmitting or relaying the data over communications down-link 119. Down-link 119 is a conventional GEO satellite communication down-link and provides widespread geographic coverage, up to hemispheric. The broadcast data is received at customer premises equipment CPE 113. CPE 113 includes an antenna 115 for reception of data over the high speed communication link 119. This portion of the system provides for the broadcast of data from a source coupled to the server 105 to CPE 113. Although only one CPE is shown in FIG. 1, it will be understood that the number CPEs is substantially unlimited and that it is intended that there is a plurality of CPEs for receiving of data broadcast from the GEO satellite 109. However, the principles of the invention apply to an arrangement in which there is at least one GEO satellite 109 and at least one CPE 113.

To provide for data verification and for error correction, the LEO satellite constellation is used. The CPE 113 includes circuitry for checking the data received from GEO satellite. In the event an error is detected, the error indication is transmitted from the CPE via a second antenna 117 to one of the satellites 121, for example, in the LEO constellation. The satellite 121 receives the error indication over a communication link 123 and retransmits the error indication to a LEO gateway 103 via an inter-satellite link 127 to a second LEO satellite 125 and communication link 129. The communication links 123 and 129 as well as the inter satellite link 127 and LEO satellites may be any of the known communication links and satellites. For example, the satellites 121, 125 and links 123, 127 and 129 may be the corresponding elements of the aforementioned IRIDIUM® system. The error indication signals are received at a gateway 103. Gateway 103 provides all the functionality of existing gateways described in conjunction with the IRIDIUM® system or with gateways for other LEO satellite systems. Gateway 103 is preferably co-located with server 105. In an alternate embodiment, one (or more) gateway 103 is a remote server and is connected to server 105 through the LEO satellites, through the LEO/GEO hybrid, or through a terrestrial communicatiuon network. As gateway 103 receives error indication signals from CPE 113, it accesses the broadcast data stored in the memory 131. Memory 131 provides a second copy of at least a portion of the error indicated data to the gateway 103. Gateway 103 transmits the data to CPE 113 via the LEO satellite constellation. Assuming that satellites 125 and 121 are still in the communication path to CPE 113, the second copy of the data is transmitted over link 129 to satellite 125, and thence to satellite 121 over link 127 and then to CPE 113 via link 123. Concurrent with the reception of the second data, CPE 113 may be continuing to receive data broadcast via GEO satellite 109 and may request additional corrected data from gatewaty 103 via the LEO satellite constellation. It will be understood by those skilled in the art that although a communication path between CPE 113 and gateway 103 has been describe in terms of a link between two LEO satellites 121, 125 that the link may comprise only one satellite 121 if satellite 121 is in line of sight communication with gateway 103 or may comprise two or more satellites if necessary to establish a communication path to the gateway 103. If the LEO satellites are part of the IRIDIUM® system, gateway 103 is an IRIDIUM® gateway. As an IRIDIUM® gateway, gateway 103 may be connected to the public switched telephone network 101.

In an alternate embodiment, the data verification and error correction may be accomplished via a land line, such as a PSTN, or other suitable terrestrial network. For example, in the event an error is detected, the error indication signal is transmitted from the CPE via PSTN 101 to gateway 103. As gateway 103 receives error indication signals from CPE 113, it accesses the broadcast data stored in the memory 131 whererby memory 131 provides a second copy of at least the portion of the error indicated data to the gateway 103. Gateway 103 transmits this data back to CPE 113 via PSTN 101.

Figure 2:
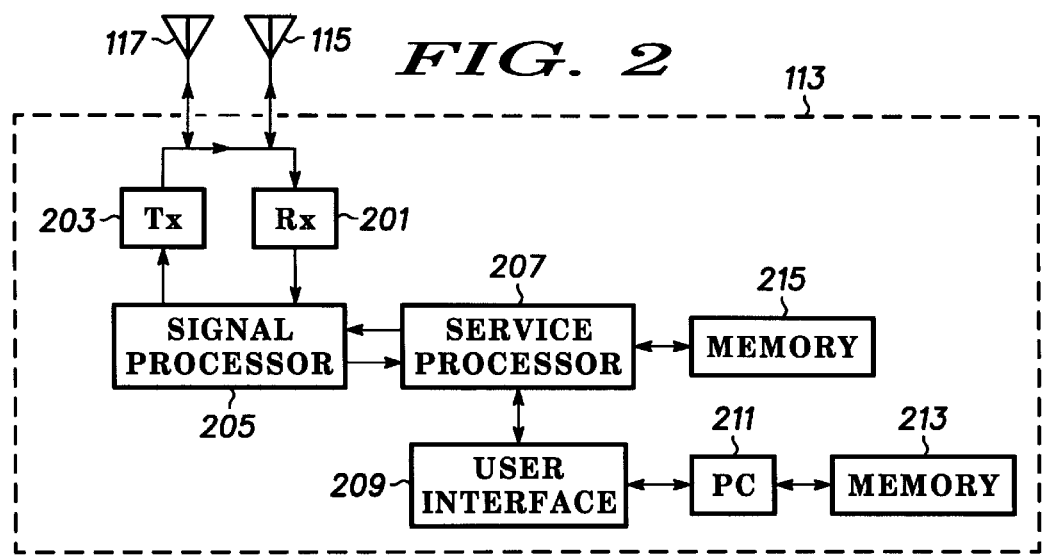
FIG. 2 is a block diagram of a portion of receiving apparatus used in the system of FIG. 1.

Turning now to FIG. 2, a portion of CPE 113 is shown in block diagram form. CPE 113 includes a first antenna 115 and a second antenna 117. The antennas 115 and 117 are used for communication two satellites simultaneously. As shown in conjunction with FIG. 1 antenna 115 is used to provide a communication link GEO satellite 109 and antenna 117 is used to provide a communication link to the LEO satellite constellation. Both antennas 115 and 117 are conventional antennas of types known in the art. Preferably, the communications links from CPE 113 to the LEO satellite constellation and from CPE 113 to the GEO satellite constellation are within a frequency range such that either antenna 115 or 117 may be utilized to communicate with either the LEO or GEO satellite constellations. CPE 113 includes receivers 201 and transmitter 203 coupled to the antennas 115 and 117. The details of the receivers 201 and transmitters 203 are not shown since these receivers and transmitters may be of conventional design. Also not shown are any diplexers which are conventionally included in satellite communications systems to permit simultaneous use of an antenna for both transmit and receive. One of receivers 201 receives broadcast data via GEO satellite 109 of FIG. 1 via antenna 115. The received data signals are processed by signal processor 205. Processor 205 provides the processed data a service processor 207. Service processor 207 may be any one of a number of commercially processor units. Service processor 207 determines the integrity of the data received by using error detection. If no error has been detected in the data, the data is stored in the memory 215. If one or more data packets contains an error, service processor 207 generates an error indication signal. The error indication signal is provided to the signal processor 205 for proper formatting. The formatted error signal is transmitted via transmitters 203 via antenna 117 to gateway 103 via the LEO satellite constellation. The returned second transmission of correct data is received over antenna 117 and receivers 201 and processed by signal processor 205 and, if error free, is stored in memory 215 or alternatively made directly available to CPE utilization apparatus. CPE utilization apparatus for utilizing the data comprises a personal computer 211 and associated memory 213 which are interfaced to service processor 207. Other CPE utilization apparatus may be employed and the personal computer 211 is intended to be illustrative of one of may types of apparatus which may utilize the broadcast data received via the GEO satellite constellation.

Figure 3:
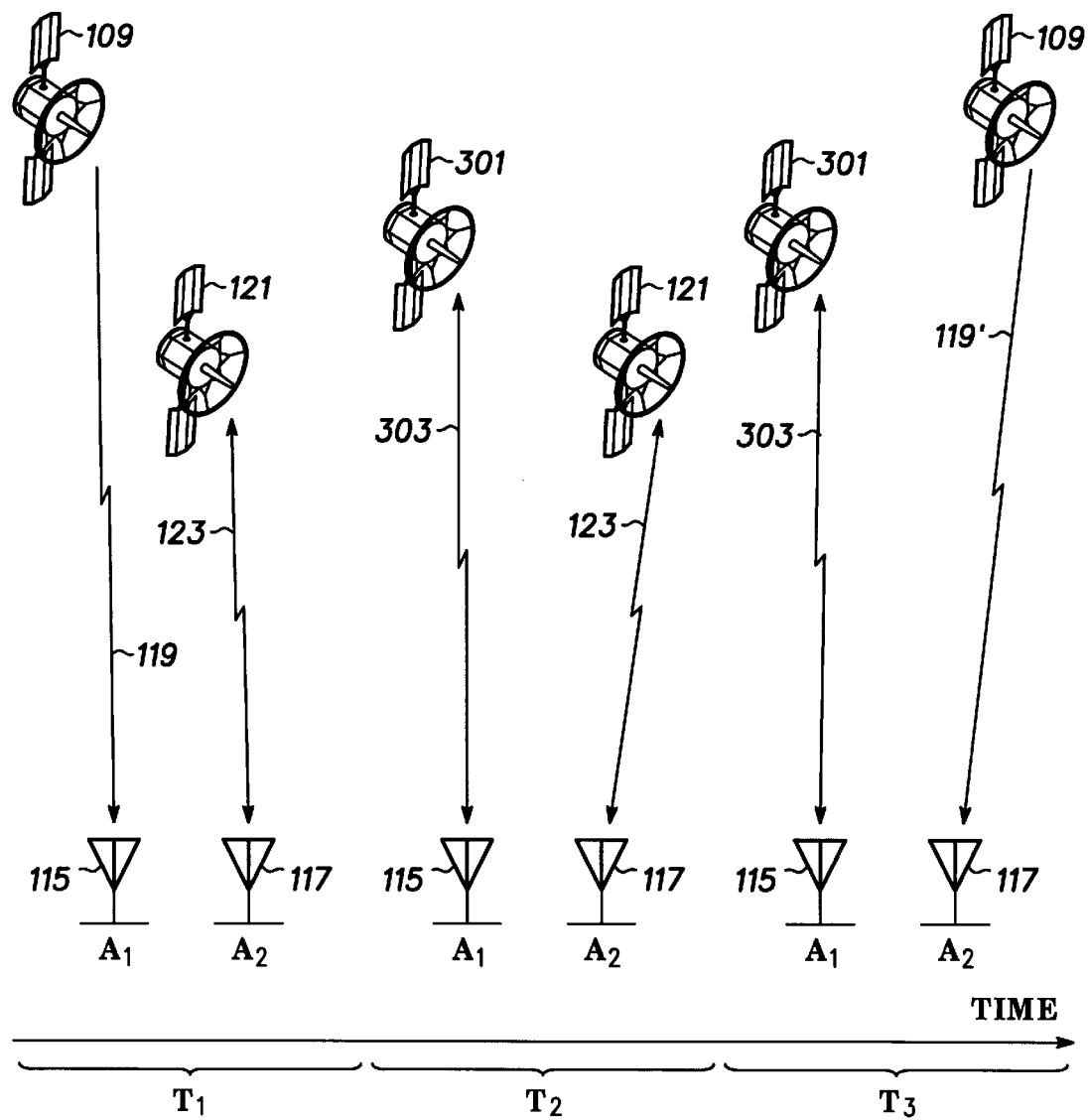
FIG. 3 is a timing diagram illustrating handoff protocol used in the system of FIG. 1.

As described above, the antennas 115 and 117 may be selected such that either antenna may be used to communicate with either the LEO or GEO satellites. In operation of the system of FIG. 1 provision must be made for the hand off of CPE 113 from LEO satellite to LEO satellite as the constellation of satellites moves. FIG. 3 illustrates the operation of CPE 113 in as communications is handed off from one LEO satellite to the next in accordance with the principles of the invention. In one embodiment of the system of FIG. 1, periodic quiescent times occur in the broadcast of data via GEO satellite 109. In the handoff protocol illustrated in FIG. 3, advantageous use is made of these quiescent periods in the GEO broadcasts to acquire another LEO satellite in the moving constellation of LEO satellites. In FIG. 3, CPE 113 has acquired LEO satellite 121 during time interval T1. During time interval T1, CPE 113 utilizes antenna 117 to maintain communications with LEO satellite 121 over communication link 123 and utilizes antenna 115 to receive broadcast data from GEO satellite 109 via communication link 119. As the LEO satellite constellation moves, a second LEO satellite 301 must be acquired by CPE 113 before LEO satellite 121 acquisition is lost. During the quiescent period of data broadcast from GEO satellite 109, i.e., time interval T2, communication link 119 is dropped, and antenna 115 is used to acquire communication with LEO satellite 301 via a communication link 303. During time interval, the equivalent of a "make before break" connection is established with LEO satellites 301. After acquisition of satellite 301, time interval T3 occurs at which time antenna 117 is used to reestablish a communication link 119' with GEO satellite 109. Antenna 115 is used to maintain the communication link 303 with the second LEO satellite 301. Similarly, antennas 115 and 117 switch roles between LEO and GEO communications as additional LEO satellites are acquired. In an alternate embodiment, a break-before-make handoff is used and there is no interruption of the GEO signal.

Figure 4:
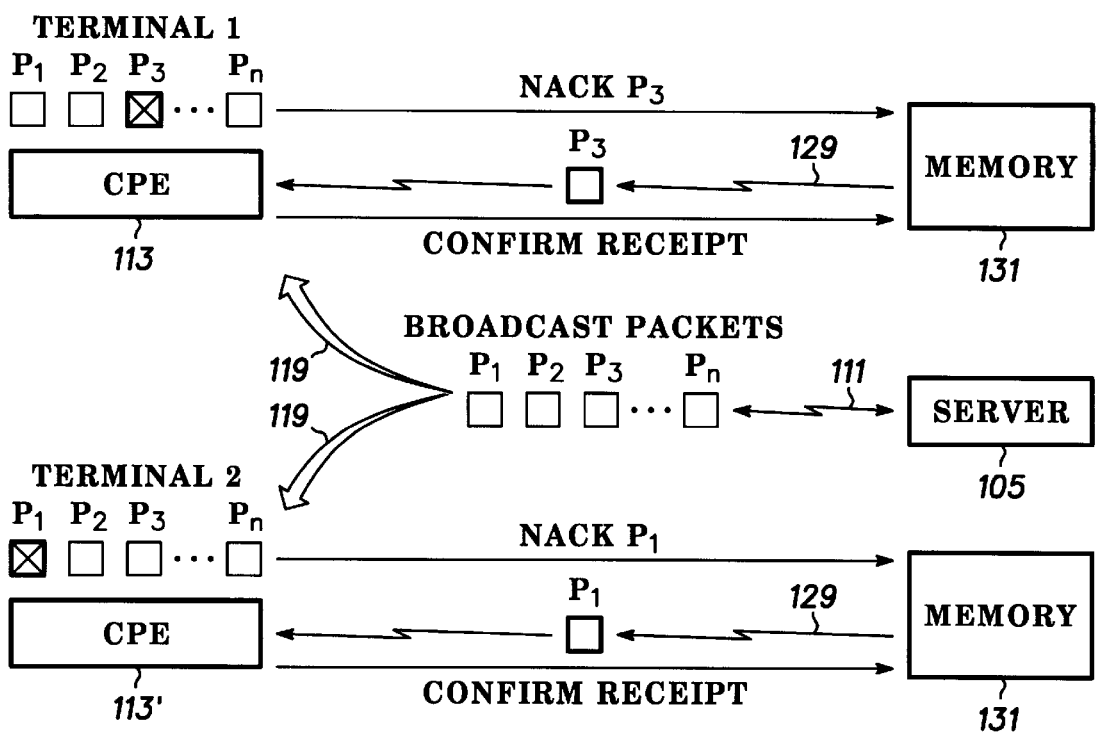
FIG. 4 illustrates the operation of the system of FIG. 1 with multiple receivers.

Turning now to FIG. 4 the operation of the system of FIG. 1 with multiple CPEs 113 receiving data broadcast from server 105 via GEO satellite 109 is illustrated. In operation, server 105 originates broadcast information comprising discrete packets of information shown as packets $P_1$, $P_2$, $P_3$, . . . $P_N$. Data packets $P_1$, $P_2$, $P_3$, . . . $P_N$ are broadcast to CPE 113 and CPE 113' via GEO communication link 119. By way of example, CPE 113 receives the data packets error free except for data packet $P_3$ which is identified as containing errors. Utilizing the LEO satellite constellation, CPE 113 transmits a "NACK" signal to gateway 103 via the communication links 123, 127 and 129. Gateway 103 responds by obtaining the data packet $P_3$ from memory 131 and transmitting the packet to CPE 113 via the LEO satellite constellation over communication links 129, 127 and 123. CPE 113 returns a signal back to gateway 103 to indicate that the data packet has been received error free. The return signal is transmitted from CPE 113 via communication links 123 127 and 129. Concurrent with the operation at CPE 113, CPE 113' also receives the data broadcast from server 105. As shown in FIG. 3, CPE 113' receives data packet $P_1$ with errors. Upon receipt of packet $P_1$ containing an error, CPE 113' transmits a $P_1$ "NACK" to gateway 103 via the LEO satellite constellation. The communication link back to gateway 103 is via the same communication links 123, 127 and 129 as for CPE 113. Server 103 obtains data packet $P_1$ from gateway 103 in the manner described above with respect to CPE 113.

As will be appreciated by those skilled in the art, the invention has been shown and described in terms of several embodiments and that various changes and modifications may be made without departing from the spirit or scope of the invention. It is intended that the invention not be limited to the embodiments shown but that it be limited in scope only by the claims appended hereto.

What is claimed is:

1. A method of broadcasting data to a plurality of receivers, comprising the steps of:

receiving said data at a first satellite communication server;

broadcasting said data from said server via a high earth orbit, HEO, satellite to a plurality of receivers;

receiving by satellite transmission an indication that a portion of said data received at one receiver of said plurality of receivers contained errors; and transmitting said portion of said broadcast data corresponding to said data that was in error to said one receiver via a low earth orbit, LEO, satellite constellation.

2. A method in accordance with claim 1, comprising:

receiving said indication via said LEO satellite constellation.

3. A method in accordance with claim 2, wherein:

said HEO satellite is a GEO satellite.

4. A method in accordance with claim 1, wherein:

said HEO satellite is a GEO satellite.

5. A method in accordance with claim 1, comprising:

storing said data in a memory prior to said broadcasting step; and obtaining said portion from said memory prior to said transmitting step.

6. A method of broadcasting data to a plurality of receivers, comprising the steps of:

receiving said data at a first satellite communication server;

broadcasting said data from said server to a plurality of receivers via a first satellite constellation;

receiving by satellite transmission an indication that a portion of said data received at one receiver of said plurality of receivers contained errors; and transmitting a first portion of said data corresponding to said portion of said broadcast data to said one receiver via a second satellite constellation.

7. A method in accordance with claim 6, wherein:

said first satellite constellation is a HEO satellite constellation and said second satellite constellation is a LEO satellite constellation.

8. A method in accordance with claim 7, wherein:

said HEO satellite constellation comprises a GEO satellite.

9. A method in accordance with claim 6, comprising:

storing said broadcast data in a memory prior to said broadcast step; and obtaining said first portion from said memory.

10. A method in accordance with claim 6, comprising:

receiving said error indication from said one receiver via said second satellite constellation.

11. A method of operating apparatus receiving satellite broadcast data, said method comprising the steps of:

receiving broadcast data via a first satellite constellation;

determining whether said data contains errors;

transmitting an indication that a portion of said received broadcast data contains errors via a second satellite constellation; and receiving a first data portion corresponding to said error containing portion via said second satellite constellation.

12. A method in accordance with claim 11, comprising:

utilizing a first antenna to receive said broadcast data from a first satellite of said first satellite constellation; and utilizing a second antenna to transmit said indication and to receive said first data portion.

13. A method in accordance with claim 12, wherein:

said second satellite constellation comprises a plurality of second satellites.

14. A method in accordance with claim 13, comprising:

utilizing said second antenna to maintain a first communication link via a first one of said second satellites;

utilizing said first antenna to acquire a second communication link via a second one of said second satellites during a predetermined time; and subsequent to said first antenna acquiring said second communication link, utilizing said second antenna to receive said broadcast data.

15. A method in accordance with claim 14, wherein:

said plurality of second satellites comprises LEO satellites.

16. A method in accordance with claim 15, wherein:

said first satellite constellation comprises one or more HEO satellites.

17. A method in accordance with claim 16, wherein:

said one or more HEO satellites comprises one or more GEO satellites.

18. Apparatus for broadcasting data to a plurality of receivers via at least one HEO satellite, comprising:

a first satellite communication server, said server receiving said data, and broadcasting said data via said at least one HEO satellite to said plurality of receivers;

means for receiving by satellite transmission an indication that a portion of said data received at one receiver of said plurality of receivers contained errors; and means for transmitting a first portion of said broadcast data corresponding to said error containing portion of said data to said one receiver via a LEO satellite constellation.

19. Apparatus in accordance with claim 18, wherein:

said receiving means receives said indication via said LEO satellite constellation.

20. Apparatus in accordance with claim 19, wherein:

said at least one HEO satellite is a GEO satellite.

21. Apparatus in accordance with claim 18, wherein:

said at least one HEO satellite is a GEO satellite.

22. Apparatus in accordance with claim 18, comprising:

memory for storing said broadcast data; and means for obtaining said first portion from said memory.

23. Apparatus for broadcasting data to a plurality of receivers comprising:

a first satellite communication server receiving said data and broadcasting said data to a plurality of receivers via a first satellite constellation;

means for receiving by satellite transmission an indication that a portion of said broadcast data received at one receiver of said plurality of receivers contained errors; and means for transmitting a first portion of said data corresponding to said portion of said broadcast data to said one receiver via a second satellite constellation.

24. Apparatus in accordance with claim 23, wherein:

said first satellite constellation is a HEO satellite constellation and said second satellite constellation is a LEO satellite constellation.

25. Apparatus in accordance with claim 24, wherein:

said HEO satellite constellation comprises a GEO satellite.

26. Apparatus in accordance with claim 23, comprising:

a memory for storing said broadcast data; and means for obtaining said first portion from said memory.

27. Apparatus in accordance with claim 23, wherein:

said receiving means receives said error indication from said one receiver via said second satellite constellation.

28. Apparatus for receiving satellite broadcast data, comprising:

a receiver coupled to receive first and second data from first and second satellite constellations, respectively;

a transmitter coupled to transmit third data to said second satellite constellation;

a processor, coupled to said receiver and said transmitter, wherein said processor determines whether at least a portion of said first data is in error, and wherein said processor causes said third data to be transmitted to said second satellite constellation thereby indicating that at least said portion of said first data is in error; and wherein said receiver receives said second data from said second satellite constellation corresponding to at least said portion of said first data that was in error.

29. Apparatus in accordance with claim 28, comprising:

a first antenna, said first antenna being utilized to receive said first data from a first satellite of said first satellite constellation; and a second antenna, said second antenna being utilized to transmit said third data and to receive said second data.

30. Apparatus in accordance with claim 29, wherein:

said second satellite constellation comprises a plurality of second satellites.

31. Apparatus in accordance with claim 30, comprising:

means for utilizing said second antenna to maintain a first communication link via a first one of said second satellites and for utilizing said first antenna to acquire a second communication link via a second one of said second satellites during a predetermined time and for utilizing said second antenna to receive said second data subsequent to said first antenna acquiring said second communication link.

32. Apparatus in accordance with claim 31, wherein:

said plurality of second satellites comprises LEO satellites.

33. Apparatus in accordance with claim 32, wherein:

said first satellite constellation comprises one or more HEO satellites.

34. Apparatus in accordance with claim 33, wherein:

said one or more HEO satellites comprises one or more GEO satellites.

* * * * *